United States Patent
Nakajima et al.

(10) Patent No.: US 7,299,716 B2
(45) Date of Patent: Nov. 27, 2007

(54) SPLIT TYPE CONNECTING ROD

(75) Inventors: Akitoshi Nakajima, Iwata (JP); Satoshi Kikuchi, Iwata (JP); Tsuyoshi Kubota, Iwata (JP); Tsuneo Isobe, Iwata (JP); Shinya Iwasaki, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 567 days.

(21) Appl. No.: 10/743,457

(22) Filed: Dec. 23, 2003

(65) Prior Publication Data

US 2004/0159178 A1 Aug. 19, 2004

(30) Foreign Application Priority Data

Dec. 26, 2002 (JP) ............ 2002-378020
Sep. 8, 2003 (JP) ............ 2003-315615

(51) Int. Cl.
*G05G 1/00* (2006.01)
*F16C 9/02* (2006.01)

(52) U.S. Cl. .......... 74/593; 74/594; 384/294; 384/906

(58) Field of Classification Search .......... 74/593, 74/594; 384/288, 294, 430, 432, 433, 906; 29/888.09
See application file for complete search history.

(56) References Cited

U.S. PATENT DOCUMENTS 3,576,353 A 4/1971 Barker et al.
3,679,244 A * 7/1972 Reddy ............ 403/109.3
4,014,596 A * 3/1977 Kazama ............ 384/207
4,693,139 A 9/1987 Mukai et al.
5,208,979 A 5/1993 Schmidt
6,125,536 A 10/2000 Spurny
6,312,159 B1 11/2001 Ishida et al.

FOREIGN PATENT DOCUMENTS

DE 3618742 A1 12/1987
JP 58-21017 2/1983
JP 61-27304 2/1986
JP 6-74237 3/1994
JP 10-128481 5/1998

OTHER PUBLICATIONS

Official Communication issued in the corresponding European Application No. 03029941.6, dated Mar. 31, 2006.

* cited by examiner

*Primary Examiner*—Chong H Kim
(74) *Attorney, Agent, or Firm*—Keating & Bennett, LLP

(57) ABSTRACT

A split type connecting rod has a simple structure that is capable of suppressing rotation of a metal bearing, and avoiding problems such as burning. The split type connecting rod 200 holds a crank-pin through a metal bearing 213 which has locking lugs 213c, 213d. A bearing locking groove 201h locks at least one of the locking lugs 213d when the metal bearing 213 rotates forward in the circumferential direction of a crank-pin hole 101d. A bearing locking groove 201i locks at least one of the locking lugs 213c when the metal bearing 213 rotates backward. The bearing locking grooves 201h, 201i are deviated from each other in the circumferential direction.

24 Claims, 5 Drawing Sheets

SPLIT TYPE CONNECTING ROD

BACKGROUND OF THE INVENTION

1. Field of the Invention

The present invention relates to a split type connecting rod, and more particularly, to a split type connecting rod with a bearing located inside of a crank-pin hole.

2. Description of the Related Art

A split type connecting rod is formed such that a large end portion is fractured and divided into a rod portion and a cap portion a long a splitting plane including the shaft center of a crank-pin hole, and the rod portion and the cap portion are coupled by coupling bolts, and a metal bearing is generally located on the inner circumferential surface of the crank-pin hole.

In general, this metal bearing has been split into a rod-side portion and a cap-side portion along the splitting plane and when such a split type metal bearing is disposed within the inner circumferential surface of the crank-pin hole, a bearing locking groove is formed in the inner circumferential surface so to extend in the circumferential direction so that a locking lug protruding from the rear surface (outer circumferential surface) of the metal bearing is locked by the bearing locking groove in order to determine a position of the metal bearing (e.g., see the Unexamined Japanese Patent Publication No.HEI 6-74237).

However, the conventional split type connecting rod has a problem in that the metal bearing is easily rotated in the circumferential direction by an external force, and in order to prevent burning caused by this problem, a reliable lubrication structure is required. In particular, a motorcycle engine which tends to be used at high speed revolutions has a problem in that a large amount of deformation occurs at the large end portion and the amount of rotation of the metal bearing is likely to increase accordingly.

SUMMARY OF THE INVENTION

In order to overcome the problems described above, preferred embodiments of the present invention provide a split type connecting rod with a simple structure that is capable of suppressing rotation of the metal bearing and reliably prevents problems such as burning.

According to a preferred embodiment of the present invention, a split type connecting rod that holds a crank-pin through a bearing having a first protrusion and a second protrusion, includes a first locking groove that locks the first protrusion of the bearing when the bearing rotates forward in a circumferential direction of the crank-pin hole, and a second locking groove that locks the second protrusion of the bearing when the bearing rotates backward in the circumferential direction of the crank-pin hole, wherein the first locking groove and the second locking groove are deviated from each other in the circumferential direction.

The split type connecting rod includes a small end portion and a large end portion, the large end portion includes a rod portion and a cap portion, wherein the first locking groove and the second locking groove are arranged to extend over both the rod portion and the cap portion when the large end portion is fractured and split into the rod portion and the cap portion. When this happens, the first locking groove is preferably deviated to the rod portion side and the second locking groove is preferably deviated to the cap portion side.

When the bearing is split as described above, the first protrusion locked by the first locking groove and the second protrusion locked by the second locking groove are arranged separately on separate portions of the bearing that has been split.

It is preferred that the bearing is substantially ring-shaped and disposed on an inner circumferential surface of the crank-pin hole.

The first and second locking grooves are preferably substantially arc-shaped.

In addition, the first and second protrusions are preferably locking lugs.

The first and second locking grooves are preferably arranged to prevent the bearing from moving in the circumferential direction.

In one preferred embodiment of the present invention, the bearing of the split type connecting rod includes a rod portion and a cap portion which are divided along a splitting line of the bearing, and at least two of the first locking grooves are provided on a first side of the splitting line and at least two of the second locking grooves are provided on a second side of the splitting line.

It is also preferred that a valley is formed on the inner circumferential surface of the crank-pin hole and that the valley includes a base portion.

It is also preferred that a fracture starting point groove is formed at the base portion of the valley, such that a width of the fracture starting point groove is less than a width of the valley.

It is further preferred that the split type connecting rod is a nut-less type of connecting rod that is made of one of a forged material, a cast material and a sintered material.

As described above, the split type connecting rod includes a small end portion and a large end portion, and the large end portion includes the valley and the fracture starting point groove is formed in the large end portion.

In another preferred embodiment of the present invention, a pair of the fracture starting point grooves are formed on the inner circumferential surface of the crank-pin hole.

It is also preferred that the valley includes a pair of sloped portions which define chamfers for guiding the bearing and preferably have curved shapes or swelled, rounded shapes, or have a concave or rectilinear shape in an upper corner thereof.

According to yet another preferred embodiment of the present invention, an engine includes a split type connecting rod according to any of the various preferred embodiments described above.

According to a further preferred embodiment of the present invention, a vehicle includes a split type connecting rod according to any of the various preferred embodiments described above.

Other features, elements, characteristics and advantages of the present invention will become more apparent from the following detailed description of preferred embodiments of the present invention.

DESCRIPTION OF THE PREFERRED EMBODIMENT

With reference now to the attached drawings, embodiments of the present invention will be explained below.

First Preferred Embodiment

Figure 1:
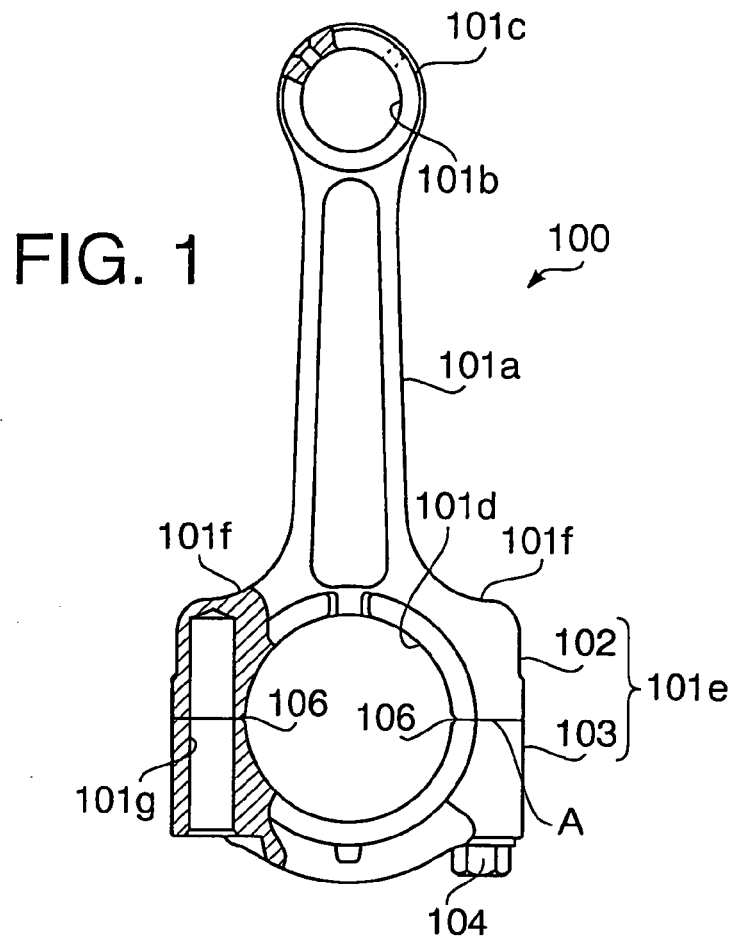
FIG. 1 is a front view of a split type connecting rod according to a first preferred embodiment of the present invention.
Figure 2:
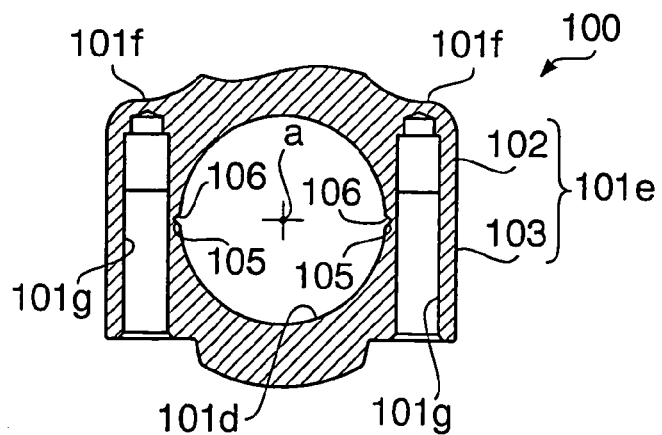
FIG. 2 is a cross-sectional view of a large end portion of the split type connecting rod of the first preferred embodiment of the present invention.
Figure 3A:
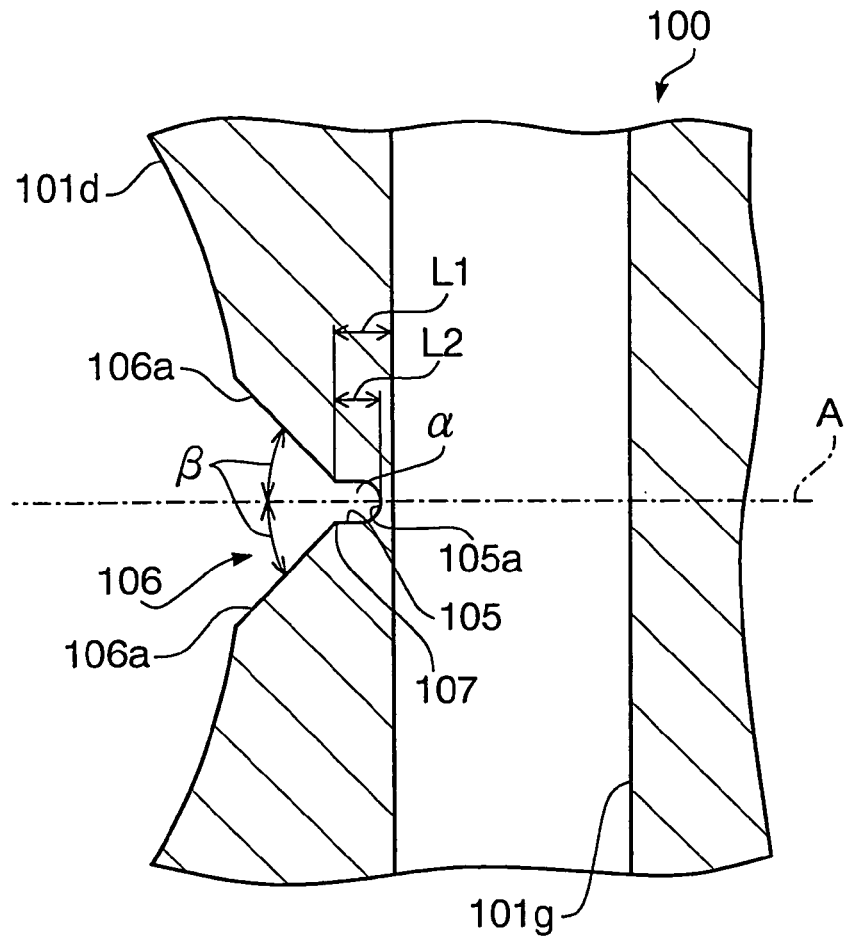
FIG. 3A is an enlarged view of a fracture starting point groove of the large end portion for illustrating the angle of a slope of the valley.
Figure 3B:
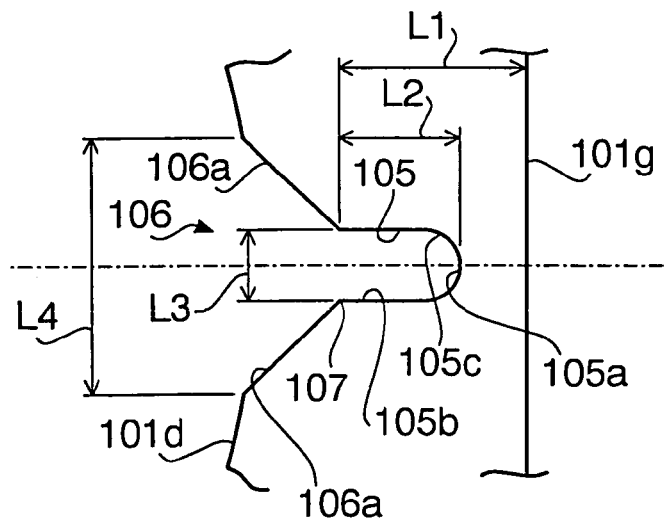
FIG. 3B is an enlarged view of a fracture starting point groove of the large end portion for illustrating the width of an opening of the valley.
Figure 4:
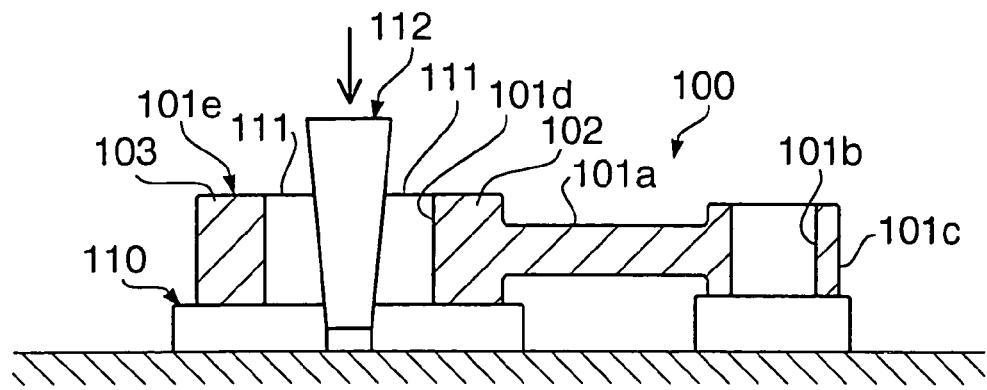
FIG. 4 illustrates a method of fracturing and splitting the large end portion.

FIGS. 1 to 4 illustrate a split type connecting rod according to a first preferred embodiment of the present invention. FIG. 1 is a front view of the split type connecting rod, FIG. 2 is a cross-sectional view of a large end portion of the split type connecting rod, FIG. 3A and FIG. 3B are enlarged views of a fracture starting point groove of the large end portion and FIG. 4 illustrates a method of fracturing and splitting the large end portion.

In these figures, reference numeral 100 denotes a split type connecting rod of the present preferred embodiment, which is preferably a nut-less type of connecting rod formed by forging, casting or sintering, or other suitable process. This split type connecting rod 100 is provided with a small end 101c having a piston-pin hole 101b at one end of a rod body 101a and a large end portion 101e having a crank-pin hole 101d at the other end.

The large end portion 101e is provided with shoulders 101f which extend rightward and leftward from the connection with the rod body 101a, and the crank-pin hole 101d is formed at the central portion between both shoulders 101f. Furthermore, bolt holes 101g which extend from the underside to the vicinity of the topside of the large end portion 101e are formed in the shoulders 101f.

In the large end portion 101e, a rod portion 102 and a cap portion 103 are preferably integral and define a single, unitary structure that is formed beforehand and the entire split type connecting rod 100 including the large end portion 101e is subjected to surface hardening treatment such as carburization and tempering. The large end portion 101e is fractured and split into a rod portion 102 and cap portion 103 along a predetermined fracture plane (straight line A in the figure). Fracturing and splitting into the rod portion 102 and cap portion 103 is performed as shown in FIG. 4 by placing the split type connecting rod 100 on a base 110, inserting sliders 111 which are movable in the diameter direction into the crank-pin hole 101d of the large end portion 101e and driving a wedge 112 between both sliders 111.

Then, these fractured and split rod portion 102 and cap portion 103 are aligned with each other by contacting both fractured and split surfaces with each other and coupled by coupling bolts 104 fitted in the respective bolt holes 101g.

Through the surface hardening treatment, a surface hardened layer having a predetermined carburization depth is formed on the outer surface of the split type connecting rod 100. For the surface hardening treatment, not only carburization and tempering but also nitriding, thermal spraying, vapor deposition or high-frequency quenching, or other suitable process, can be used.

On the inner circumferential surface of the crank-pin hole 101d, a pair of fracture starting point grooves 105 which extend in the shaft center direction of the crank-pin hole 101d are preferably formed. The fracture starting point grooves 105 are preferably formed by notching through cutting, wire cutting (wire cutting electric discharge machining) or machining using a laser, or other suitable process, and are formed along a line of intersection between the plane that will define a fracture plane (expressed by straight line A in the figure) between the rod portion 102 and cap portion 103 of the large end portion 101e, and the inner circumferential surface. That is, in the case of forming the fracture starting point grooves 105 by, e.g. wire cutting, a conductive wire is placed near a predetermined position of the inner circumferential surface of the crank-pin hole 101d and a pulsed high voltage is applied between this conductive wire and the inner circumferential surface of the crank-pin hole 101d. This produces a corona discharge between the conductive wire and the inner circumferential surface of the crank-pin hole 101d and this discharge causes a portion of the inner circumferential surface of the crank-pin hole 101d to be shaved, thereby forming the fracture starting point grooves 105.

Between the inner circumferential surface of the crank-pin hole 101d and the fracture starting point grooves 105, a valley 106 is formed. The valley 106 is formed by chamfering upper and lower corners which are formed by the fracture starting point grooves 105 and the inner circumferential surface of the crank-pin hole 101d. Furthermore, the opening of the valley 106 is preferably wider than the opening of the fracture starting point grooves 105. This valley 106 is preferably formed through machining such as wire cutting as with the fracture starting point grooves 105 or simultaneously with molding of the split type connecting rod 100 through forging, casting or sintering, or other suitable process.

As shown in FIG. 2, FIG. 3A and FIG. 3B, sloped portions 106a making up the valley 106 are preferably formed by linear notching in such a way that an angle β formed with the straight line A (a plane that will define a fracture plane) passing from the shaft center a of the crank-pin hole 101d through a bottom portion 105a in a bottom surface 105c of the fracture starting point grooves 105 is preferably about 45 degrees. This causes the interior angle of the valley 106 to be approximately 90 degrees. Furthermore, upper and lower inner surfaces 105b of the fracture starting point groove 105 are formed in such a way that an angle α formed with the straight line A is approximately 0 degrees, that is, substantially parallel to the straight line A.

Furthermore, the valley 106 preferably has a greater opening width L4 than an opening width L3 of the fracture starting point groove 105. This causes the sloped portions 106a making up the valley 106 to function as chamfers when a bi-partitioned metal bearing (not shown) is inserted into the crank-pin hole 101d in the direction of the bolt hole 101g.

Here, the chamfering function of the sloped portions 106a will be explained. When no chamfering is applied to the corners, the metal bearing contacts the corners when the metal bearing is fitted into the crank-pin hole. Metal plating such as Sn (tin) plating is applied to the surface of the metal bearing as an anti-corrosion layer. When this plated layer comes into contact with the sharp corners formed by fracturing and splitting, a portion of the plated layer is shaved into particles and these particles are stuck to the fracture surface. The stuck particles hamper high-precision recoupling of the split type connecting rod. In contrast, when chamfering is applied to the corners, that is, when the valley 106 is formed, a portion of the plated layer is hardly shaved, making it possible to suppress generation of particles which is a factor in the hampering of high-precision recoupling of the split type connecting rod.

The ratio of the depth L2 of the fracture starting point groove 105 to a shortest distance L1 from the base point of the fracture starting point groove 105 (that is, a boundary 107 between the inner surface 105b and sloped portion 106a) to the edge of the bolt hole 101g is preferably about 70% or above.

Thus, according to this preferred embodiment, a pair of fracture starting point grooves 105 which extend in the inner circumferential surface of the crank-pin hole 101d in the shaft center direction are formed, sloped portions 106a are formed in the upper and lower corners between the fracture starting point groove 105 and the innercircumferential surface of the crank-pinhole 10d. The valley 106 preferably has an opening width L4 that is wider than the opening width L3 of the fracture starting point groove 105. In other words, the angle β formed by the valley 106 and the straight line A is preferably greater than the angle α formed by the fracture starting point groove 105. As a result, it is possible to set a greater ratio of the depth L2 of the fracture starting point groove 105 to the shortest distance L1 from the base point of the fracture starting point groove 105 to the edge of the bolt hole 101g with respect to the inner circumferential surface of the crank-pin hole 101d as the base point and reliably form a hardened layer through surface hardening treatment up to the bottom portion 105a of the fracture starting point groove 105. This makes it possible to increase a stress expansion coefficient at the bottom portion 105a of the fracture starting point groove 105, to prevent peeling or falling at the time of fracturing and splitting, and to avoid problems such as damage or burning due to falling when the engine is running.

Second Preferred Embodiment

Figures 5A, 5B:
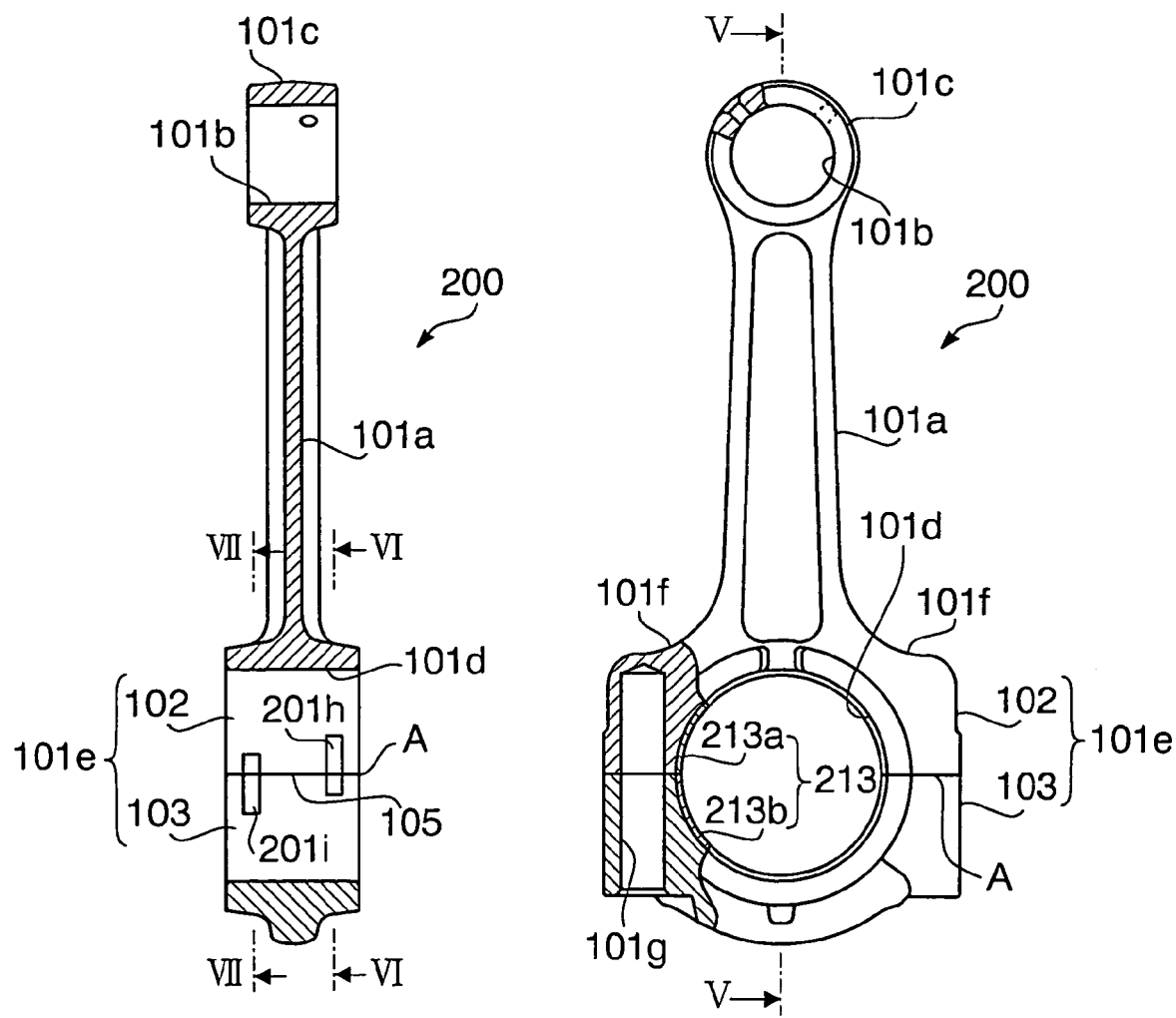
FIG. 5A is a front view of a split type connecting rod according to a second preferred-embodiment of the present invention.
FIG. 5B is a cross-sectional view of the split type connecting rod shown in FIG. 5A along a line V-V.
Figure 6:
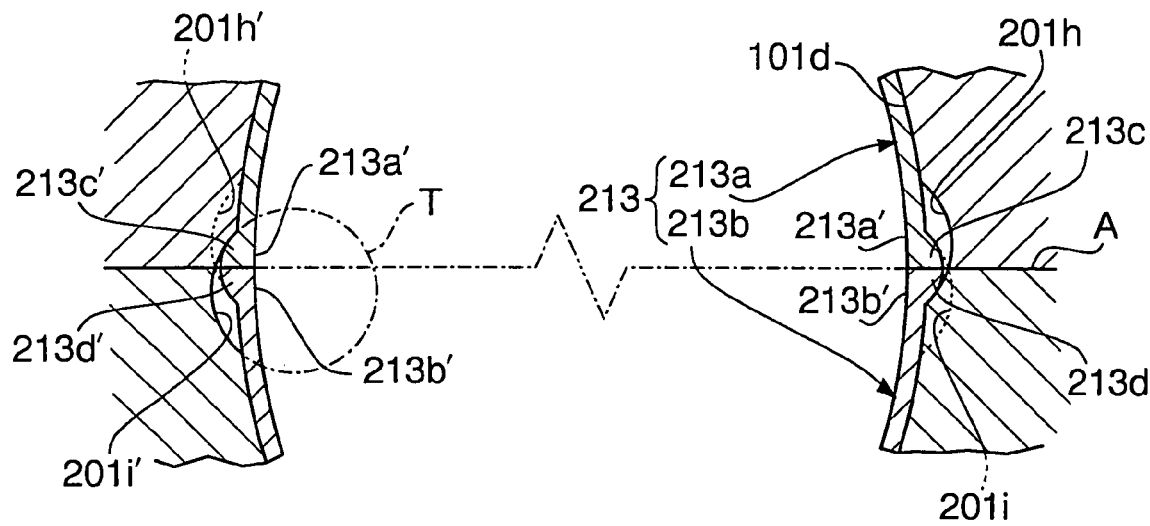
FIG. 6 is a cross-sectional view of the split type connecting rod shown in FIG. 5B along a line VI-VI.
Figure 7:
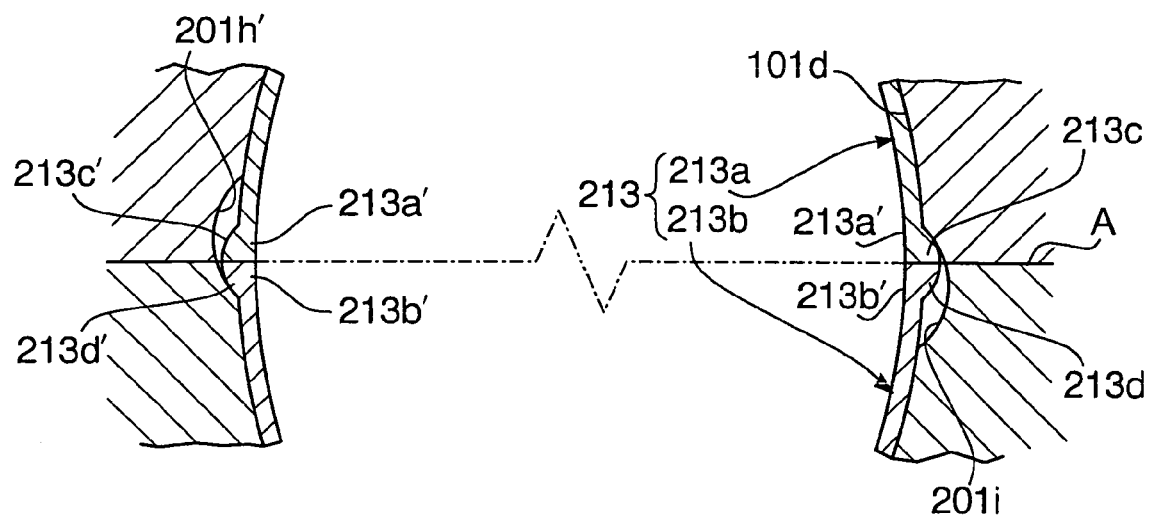
FIG. 7 is a cross-sectional view of the split type connecting rod shown in FIG. 5B along a line VII-VII.

FIG. 5A, FIG. 5B, FIG. 6 and FIG. 7 illustrate a split type connecting rod according to a second preferred embodiment of the present invention. FIG. 5A is a front view of the split type connecting rod of this embodiment, FIG. 5B is a cross-sectional view of the split type connecting rod shown in FIG. 5A along a line V-V, FIG. 6 is a cross-sectional view of the split type connecting rod shown in FIG. 5B along a line VI-VI and FIG. 7 is a cross-sectional view of the split type connecting rod shown in FIG. 5B along a line VII-VII. The split type connecting rod which will be explained in this preferred embodiment preferably has a basic configuration similar to that of the split type connecting rod 100 explained in the first preferred embodiment and identical components or components corresponding to each other between the two preferred embodiments are assigned the same reference numerals and detailed explanations thereof will be omitted.

A split type connecting rod 200 in this preferred embodiment is provided with a substantially ring-shaped metal bearing 213 on the inner circumferential surface of a crank-pin hole 101d. This metal bearing 213 is split into two portions of a rod-side metal bearing portion 213a and a cap-side metal bearing portion 213b along splitting lines on which the fracture plane (straight line A) and the crank-pin hole 101d cross each other. That is, fracture starting point grooves 105 and the rod-side metal bearing portion 213a and the cap-side metal bearing portion 213b each preferably have a substantially semicircular shape.

Furthermore, bearing locking grooves 201h and 201i are provided on the one splitting line side of the inner circumferential surface of the crank-pin hole 101d, while bearing locking grooves 201h' and 201i' are provided on the other splitting line side. As shown in FIG. 6, the bearing locking grooves 201h, 201h', 201i, 201i' are preferably formed by revolving a grooving cutter T which is placed in such a way as to be inscribed in the crank-pin hole 101d and cutting to a predetermined depth. The bearing locking grooves 201h, 201h', 201i, 201i' are preferably arc-shaped when viewed in the shaft center direction of the crank-pinhole 101d (see FIG. 6 and FIG. 7) Furthermore, when viewed in the direction that is substantially perpendicular to the shaft center of the crank-pin hole 101d, the bearing locking grooves 201h, 201h', 201i, 201i' are formed so as to extend over the splitting line in the circumferential direction and so as to deviate to either side of the splitting line in the circumferential direction (see FIG. 5B). More specifically, the bearing locking grooves 201h, 201h' deviate to the rod portion 102 side, while the bearing locking grooves 201i, 201i' deviate to the cap portion 103 side. In other words, of the bearing locking grooves 201h, 201i juxtaposed to each other in the shaft center direction of the crank-pin hole 101d, the bearing locking groove 201h is formed so as to deviate to the rod portion 102 side, while the bearing locking groove 201i is formed so as to deviate to the cap portion 103 side. On the other hand, of the bearing locking grooves 201h', 201i' juxtaposed to each other in the shaft center direction of the crank-pin hole 101d, the bearing locking groove 201h' is formed so as to deviate to the rod portion 102 side, while the bearing locking groove 201i' is formed so as to deviate to the cap portion 103 side.

Furthermore, as shown in FIG. 6, locking lugs 213c, 213c', preferably two lugs each, are provided on the back of both ends 213a' of the substantially semi-circular rod-side metal bearing portion 213a, and locking lugs 213d, 213d', preferably two lugs each, are provided on the back of both ends 213b' of the substantially semi-circular cap-side metal bearing portion 213b. The locking lugs 213c are locked by the bearing locking grooves 201h, 201i formed on the split type connecting rod 200 side, while the locking lugs 213c' are locked by the bearing locking grooves 201h', 201i' formed on the split type connecting rod 200 side. The locking lugs 213d are locked by the bearing locking grooves 201h, 201i formed on the split type connecting rod 200 side, while the locking lugs 213d' are locked by the bearing locking grooves 201h', 201i' formed on the split type connecting rod 200 side.

More specifically, since the bearing locking grooves 201h, 201h', 201i, 201i' are deviated to either side of the splitting line in the circumferential direction, the locking lugs 213c, 213c' of the rod-side metal bearing portion 213a are locked at the ends on the rod portion 102 side of the bearing locking grooves 201i, 201i' deviated to the cap portion 103 side. The locking lugs 213d, 213d' of the cap-side metal bearing portion 213b are locked at the ends on the cap portion 103 of the bearing locking grooves 201h, 201h' deviated to the rod portion 102 side.

The operations and effects of the preferred embodiment of the present invention will be explained.

According to the bearing structure of this preferred embodiment, the locking lugs 213c. 213c' of the rod-side metal bearing portion 213a are locked at the end of the bearing locking grooves 201i, 201i' and the locking lugs 213d, 213d' of the cap-side metal bearing portion 213b are locked at the end of the bearing locking grooves 201h, 201h', and therefore it is possible to prevent the rod-side metal bearing portion 213a and cap-side metal bearing portion 213b from moving in the circumferential direction.

Here, since the bearing locking grooves 201h, 201h', 201i, 201i' are deviated in the circumferential direction, it is possible to lock the locking lugs 213c, 213c', 213d, 213d' at the end of the bearing locking grooves 201h, 201h', 201i, 201i' without reducing the diameter of the grooving cutter T, that is, the diameters of the bearing locking grooves 201h, 201h', 201i, 201i'. It is also possible to avoid the problem of stress concentration caused by reducing the diameters of the bearing locking grooves 201h, 201h', 201i, 201i'. That is, when the necessary depth is secured while reducing the diameter of the grooving cutter T, i.e. the diameters of the bearing locking grooves 201h, 201h', 201i, 201i', the shape changes drastically in the bearing locking groove on the internal surface of the crank-pin hole 101d and the problem of stress concentration is likely to occur. On the other hand, when the diameters of the bearing locking grooves 201h, 201h', 201i, 201i' are simply increased, the locking lugs 213c, 213c', 213d, 213d' move easily in the circumferential direction in the bearing locking grooves 201h, 201h', 201i, 201i', which makes it easier for the metal bearing 213 to move in the circumferential direction. However, this preferred embodiment can prevent this problem because the locking lugs 213c, 213c', 213d, 213d' are locked at the end of the bearing locking grooves 201h, 201h', 201i, 201i'.

Figure 8:
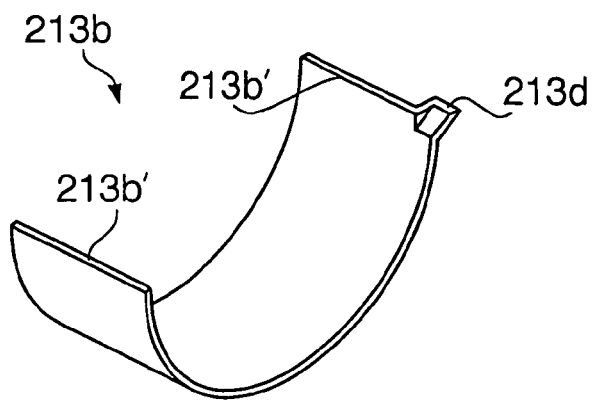
FIG. 8 is a perspective view of an example of a cap-side metal bearing portion with a protruding locking lug provided at only one of the two ends.
Figure 9:
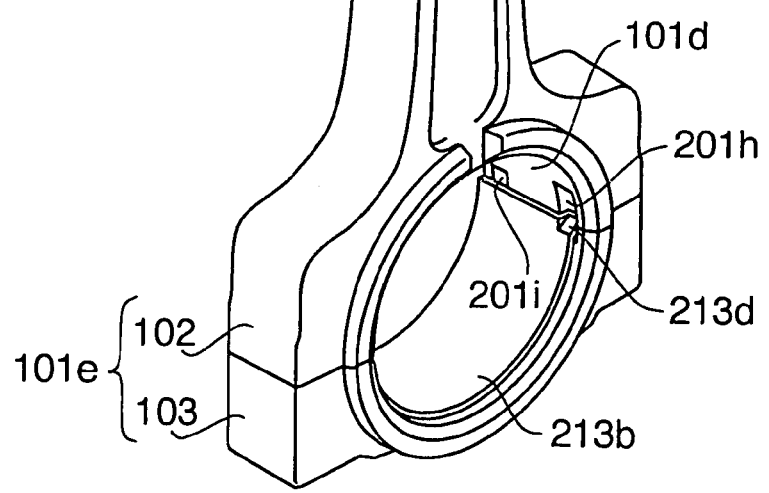
FIG. 9 is a perspective view of the split type connecting rod provided with the cap-side metal bearing portion shown in FIG. 8.

In this preferred embodiment, the bearing locking grooves are preferably formed on both splitting lines, but the bearing locking grooves of various preferred embodiments of the present invention may be formed only on one splitting line. That is, as shown in FIG. 6 and FIG. 7, this preferred embodiment assumes that the locking lugs 213c, 213c' protrude from both ends 213a' of the rod-side metal bearing portion 213a and the locking lugs 213d, 213d' protrude from both ends 213b' of the cap-side metal bearing portion 213b. However, it is also possible to use the rod-side metal bearing portion 213a from which a locking lug (e.g., locking lug 213c) protrudes for only one of both ends 213a' and use the cap-side metal bearing portion 213b from which a locking lug (locking lug 213d when only the locking lug 213c protrudes from the rod-side metal bearing portion 213a) protrudes for only one of both ends 213b'. FIG. 8 is a perspective view of one example of the cap-side metal bearing portion 213b from which one locking lug 213d protrudes for only one of both ends 213b40. Furthermore, FIG. 9 is a perspective view of the split type connecting rod 200 when this cap-side metal bearing portion 213b is attached. As shown in FIG. 9, the locking lug 213d of the cap-side metal 213b is locked by the bearing locking groove 201h provided on the inner circumferential surface of the crank-pin hole 101d. In actual use of such a cap-side metal bearing portion 213b, the rod-side metal bearing portion 213a where one locking lug 213c is provided on one of the two ends 213a' so as to be locked by the bearing locking groove 201i is also attached together. Therefore, it is possible to stop rotation in the circumferential direction of the rod-side metal bearing portion 213a and cap-side metal bearing portion 213b. Thus, it is possible to realize the operations and effects similar to those of the split type connecting rod 200 explained in this preferred embodiment without providing the bearing locking grooves 201h', 201i'.

In the above-described case, it is also possible to introduce the features of the split type connecting rod 100 explained in the first preferred embodiment into the split type connecting rod 200 of this preferred embodiment. More specifically, it is possible to form the valley 106 explained in the first preferred embodiment at positions where the bearing locking grooves 201h', 201i' are not provided, that is, at the positions on the predetermined fracture plane facing the bearing locking grooves 201h, 201i on the inner circumferential surface of the crank-pin hole 101d.

The present invention is not limited to the above described preferred embodiments, and various variations and modifications may be possible without departing from the scope of the present invention.

This application is based on the Japanese Patent Application No.2002-378020 filed on Dec. 26, 2002 and the Japanese Patent Application No.2003-315615 filed on Sep. 8, 2003, the entire contents of which are expressly incorporated by reference herein.

What is claimed is:

1. A split connecting rod that holds a crank-pin through a bearing having a first protrusion and a second protrusion, comprising:
   a first locking groove that locks the first protrusion of said bearing when said bearing rotates forward in a circumferential direction of a crank-pin hole;
   a second locking groove that locks the second protrusion of said bearing when said bearing rotates backward in the circumferential direction of the crank-pin hole; and
   a large end portion including a rod portion and a cap portion; wherein
   said first locking groove and said second locking groove are offset from each other in said circumferential direction;
   said first locking groove and said second locking groove are arranged to extend over both of the rod portion and the cap portion when the large end portion is fractured and split into said rod portion and said cap portion; and
   said first locking groove is sized so as to be capable of receiving said first protrusion along substantially an entire length of said first locking groove and said second locking groove is sized so as to be capable of receiving said second protrusion along substantially an entire length of said second locking groove.

2. The split connecting rod according to claim 1, wherein said first locking groove is offset to said rod portion side and said second locking groove is offset to said cap portion side.

3. The split connecting rod according to claim 1, wherein when said bearing is split, said first protrusion locked by said first locking groove and said second protrusion locked by said second locking groove are arranged separately on separate portions of said bearing that has been split.

4. The split connecting rod according to claim 1, wherein the bearing is substantially ring-shaped and disposed on an inner circumferential surface of the crank-pin hole.

5. The split connecting rod according to claim 1, wherein the bearing includes a rod portion and a cap portion which are divided along a splitting line of said bearing.

6. The split connecting rod according to claim 5, further comprising at least two of the first locking grooves provided on a first side of the splitting line and at least two of the second locking grooves provided on a second side of the splitting line.

7. The split connecting rod according to claim 1, wherein the first and second locking grooves are substantially arc-shaped.

8. The split connecting rod according to claim 1, wherein the first and second protrusions are locking lugs.

9. The split connecting rod according to claim 1, wherein the first and second locking grooves are arranged to prevent the bearing from moving in said circumferential direction.

10. The split connecting rod according to claim 1, wherein a valley is formed on said inner circumferential surface of the crank-pin hole, the valley includes a base portion, and a fracture starting point groove formed at the base portion of said valley.

11. The split connecting rod according to claim 10, wherein a width of said fracture starting point groove is less than a width of said valley.

12. The split connecting rod according to claim 1, wherein the split connecting rod is a nut-less connecting rod that is made of one of a forged material, a cast material and a sintered material.

13. The split connecting rod according to claim 10, further comprising a small end portion, wherein the large end portion includes the valley and the fracture starting point groove is formed in the large end portion.

14. The split connecting rod according to claim 10, wherein a pair of the fracture starting point grooves are formed on the inner circumferential surface of the crank-pin hole.

15. The split connecting rod according to claim 10, wherein the valley includes a pair of sloped portions.

16. The split connecting rod according to claim 15, wherein the sloped portions define chamfers for guiding the bearing.

17. The split connecting rod according to claim 15, wherein the sloped portions have curved shapes.

18. The split connecting rod according to claim 15, wherein the sloped portions have swelled, rounded shapes.

19. The split connecting rod according to claim 10, wherein the valley has a concave shape in an upper corner thereof.

20. The split connecting rod according to claim 10, wherein the valley has a rectilinear shape in an upper corner thereof.

21. An engine comprising the split connecting rod according to claim 1.

22. A vehicle comprising the split connecting rod according to claim 1.

23. The split connecting rod according to claim 1, wherein the first locking groove and the second locking groove are arranged inwardly from an edge of the crank-pin hole in an axial direction of the crank-pin hole.

24. The split connecting rod according to claim 1, wherein the first and second locking grooves are arranged to prevent the bearing from moving in an axial direction of the crank-pin hole.

* * * * *